United States Patent [19]

Honda et al.

[11] Patent Number: 5,220,245

[45] Date of Patent: Jun. 15, 1993

[54] LIGHTING SYSTEM FOR MOTOR-DRIVEN VEHICLE

[75] Inventors: Satoshi Honda; Kenji Tamaki, both of Saitama, Japan

[73] Assignee: Honda Giken Kogyo Kabushiki Kaisha, Tokyo, Japan

[21] Appl. No.: 797,070

[22] Filed: Nov. 25, 1991

[30] Foreign Application Priority Data

Feb. 22, 1991 [JP] Japan .................. 3-028927

[51] Int. Cl.$^5$ .............................................. B60Q 1/04
[52] U.S. Cl. ........................................ 315/82; 315/79; 315/83; 307/10.8
[58] Field of Search .................. 315/77, 79, 82, 83; 307/10.8

[56] References Cited

U.S. PATENT DOCUMENTS

| | | | |
|---|---|---|---|
| 4,684,819 | 8/1987 | Haag et al. | 315/82 X |
| 5,030,884 | 7/1991 | Roussey et al. | 315/83 |

FOREIGN PATENT DOCUMENTS

| | | | |
|---|---|---|---|
| 0001986 | 1/1977 | Japan | 315/79 |
| 0025489 | 2/1977 | Japan | 315/79 |
| 0102736 | 8/1979 | Japan | 315/79 |

*Primary Examiner*—Eugene R. LaRoche
*Assistant Examiner*—Son Dinh

[57] ABSTRACT

A lighting system for a motor driven vehicle having a headlight for connection to a power source and a lighting switch operatively connected to the headlight for selectively supplying power thereto. A first detector member for detecting the on and off positions of the lighting switch and for generating a signal responsive thereto. A second detector member for detecting a stopped state and movement of the vehicle and for generating a signal responsive thereto. A converter operatively connected to the headlight and for connection to a power source for selectively adjusting the voltage supplied to the headlight in accordance with signals generated by the first and second detector members for dimming the headlight when the lighting switch is in an off position and during a stopped state of the vehicle.

7 Claims, 1 Drawing Sheet

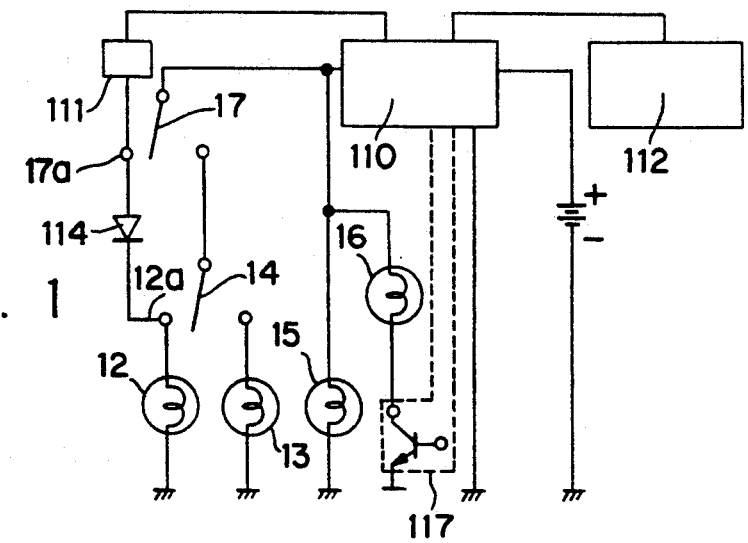
FIG. 1
| LIGHTING SWITCH | VEHICLE CONDITION | LIGHT | | | |
|---|---|---|---|---|---|
| | | H/L Hi | H/L Lo | T/L | M/L |
| OFF | STATIONARY | △ | × | △ | × |
| OFF | MOVING | △ | × | △ | × |
| ON | STATIONARY | △ | △ | △ | △ |
| ON | MOVING | ○ | ○ | ○ | ○ |
FIG. 2
× TURNED OFF
△ DIM LIGHT
○ TURNED ON
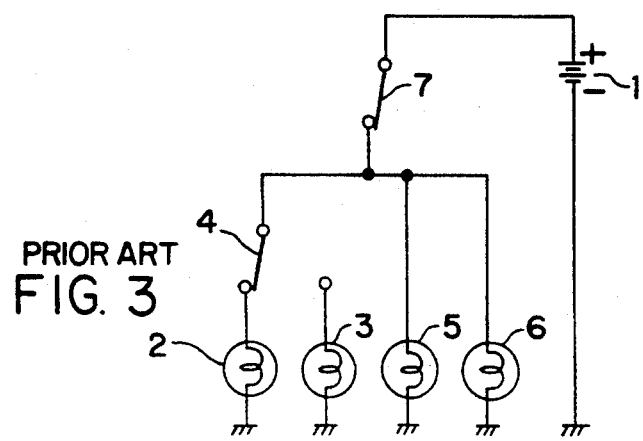
PRIOR ART
FIG. 3

LIGHTING SYSTEM FOR MOTOR-DRIVEN VEHICLE

BACKGROUND OF THE INVENTION

1. Field of the Invention

The present invention relates to a lighting system for a motor-driven vehicle.

2. Description of Background Art

FIG. 3 is a wiring diagram of a conventional lighting system mounted on a motorcycle. A battery 1 is operatively connected to a bulb 2 for providing a high beam and to a bulb 3 for providing a low beam. The bulbs 2 and 3 are changed over in an alternative way by a dimmer switch 4. A bulb 5 is provided as a taillight and a meter lamp 6 is provided which is turned on and off together with the bulbs 2 and 3 by means of a lighting switch 7.

According to the construction of the above conventional lighting system, the headlight, taillight, etc. are turned on or off simultaneously when the lighting switch is turned on or off. Since the quantity of light for the headlight is set at a value required during the night, even in the case where a large quantity of light is not required, for example when the headlight is to be used only for visibility, the headlight is illuminated to an excessive degree. Thus, the power consumption is increased. Particularly, in a so-called motor-driven vehicle using electricity as a drive source, the above point causes a problem because a battery of a large capacity is needed.

SUMMARY AND OBJECTS OF THE INVENTION

The present invention has been developed in view of the above-mentioned circumstances and it is the object of the invention to provide a lighting system for a motor-driven vehicle capable of adjusting the quantity of light for bulbs in accordance with whether the vehicle is running during the daytime or during the night and also in accordance with whether the vehicle is stopped or running, thereby minimizing the electric power consumed by the headlight.

In order to achieve the above-mentioned object, the lighting system for a motor-driven vehicle according to the present invention includes a detector means for detecting whether a lighting switch is on or off, a detector means for detecting whether the vehicle is in a stopped state or in a running state, and a converter disposed between a battery and a headlight to adjust a voltage to be supplied to the headlight in accordance with detected signals provided from both detector means so that the quantity of light is decreased when at least visibility is to be ensured.

The operation of the vehicle in the daytime or at night is detected according to the lighting switch being on or off. If the vehicle is operated in the daytime, the quantity of light of the headlight bulbs is decreased to a degree permitting visibility to be ensured by decreasing the supply voltage. If the vehicle is in a stopped state, the quantity of light of the headlight bulbs is decreased at night by decreasing the supply voltage as in the previous case.

Thus, the quantity of light of the headlight bulbs is adjusted in two stages one of which is for irradiating the front and the other for merely ensuring visibility. When visibility is to be ensured, the quantity of light is decreased to a minimum allowable degree, thereby minimizing the electric power consumed by the headlight bulbs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a circuit diagram of a lighting system embodying the present invention;

FIG. 2 is a diagram explaining the operation thereof; and

FIG. 3 is a circuit diagram of a conventional lighting system.

DETAILED DESCRIPTION OF THE PREFERRED EMBODIMENT

An embodiment of the present invention will be described below with reference to the drawings. FIG. 1 is a circuit diagram of a lighting system embodying the present invention and mounted on a motorcycle using a motor as a drive source. FIG. 2 is a diagram for showing the operation of the lighting system.

In FIG. 1, a DC-DC converter 110 is provided for supplying electricity to headlight bulbs 12 and 13, a taillight bulb 15, etc. As will be described below, the converter 110 changes the voltage to be supplied to the headlight bulbs 12 and 13, etc. in accordance with whether a lighting switch is on or off or whether the vehicle with the lighting system mounted is in a stopped state or in a running state. More specifically, a detector means 111 detects whether the lighting switch 17 is on or off. Detector means 112 is provided for detecting whether the vehicle is in a stopped state or in a running state. The detector means is connected to the converter 110, and in accordance with detected signals provided from the detector means, the converter 110 decreases the voltage to be supplied to the headlight bulbs 12 and 13, etc. from a normal 12 V to 10 V.

The detector means 111 has a cable which extends from the converter 110, one end of the cable extends up to a connection terminal 12a of the bulb 12 which is the high beam. A diode 114 and an off contact 17a of the lighting switch 17 are disposed in intermediate positions of the cable. Whether the lighting switch 17 is on or off is judged on the basis of a potential change on an anode side of the diode 114.

A second detector means 112 detects the number of revolutions of a driving motor (not shown) and judges whether the vehicle is in a running state or in a stopped state on the basis of whether the detected value corresponds to a predetermined number or more or fewer revolutions of the driving motor.

On the ground side of a meter lamp 16, a switch 117 is provided which is interlocked with the lighting switch 17 and which is changed over between an OFF position interlocked with OFF of the lighting switch 17 and an ON position interlocked with ON of the lighting switch 17.

According to the lighting system of the above construction, as shown in FIG. 2, when the lighting switch 17 is OFF, thereby judging the ambient condition to be daytime, the voltage supplied by the converter 110 is decreased to 10 V, thereby decreasing the quantity of the light of the high beam bulb 12 and that of the taillight bulb 15 each down to a value capable of ensuring visibility. At this time, the lighting switch 17 is turned OFF, so the switch 117 is turned OFF at the same time and the meter lamp 16 goes off. Thus, when the lighting switch 17 is OFF, the quantity of light of the high beam bulb 12 is decreased to a certain value irrespective of whether the vehicle is running or stopped.

When the lighting switch 17 is turned ON at night and when the vehicle has been stopped, for example during a waiting period for a signal change, this condition is detected by the detector means 111, 112 and the voltage supplied by the converter 110 is decreased to 10 V, whereby the quantity of light in each of high beam bulb 12, low beam bulb 13, taillight bulb 15 and meter lamp 16 is decreased. This change in the quantity of light will cause no problem because the vehicle is stopped and the headlight bulbs 12 and 13 are used not for irradiating the front, but mainly for ensuring visibility. Thereafter, when the vehicle begins to move, this is detected by the detector means 112 and the voltage supplied by the converter 110 is returned to 12 V, so that the headlight bulbs 12, 13, taillight bulb 15 and meter lamp 16 increase in the quantity of light, thus affording a comfortable level of illumination during operation.

In the above embodiment, not only the headlight bulbs 12 and 13, but also the taillight bulb 15 and meter light 16 are adjusted in the quantity of heat generated by the lights. This does not constitute any limitation. Only the headlight bulbs 12 and 13 may be controlled, or right and left winker lamps may also be controlled. The detector means for detecting whether the vehicle is in a running state or in a stopped state is not limited to the one based on the number of revolutions of the driving motor. There may be adopted a construction wherein the detection is made on the basis of a vehicle speed obtained from the number of revolutions of the front wheel.

According to the present invention, as set forth above, the headlight bulbs are changed over between the condition where they are used for irradiating the front and the condition where they are used for ensuring visibility, in accordance with whether the lighting switch is on or off. In the case of using the headlight bulbs for the purpose of ensuring visibility, the quantity of light is decreased within an allowable range to minimize the electric power consumed by the headlight bulbs. Thus, by maintaining the electric power from the battery low it is made possible to lengthen the driving distance of the vehicle while the headlight is ON.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A lighting system for a motor driven vehicle having a headlight adapted to be connected to a power source and a lighting switch operatively connected to said headlight for selectively supplying power thereto the improvement being characterized by:

a first detector means for detecting on and off positions of the lighting switch and for generating a signal responsive thereto:

a second detector means for detecting a stopped state and movement of the vehicle and for generating a signal responsive thereto; and a converter operatively connected to said headlight and adapted to be connected to a power source for selectively adjusting the voltage supplied to said headlight in accordance with signals generated by said first and second detector means for dimming the headlight when said lighting switch is in an off position and the vehicle is stationary; said light switch is in an off position and the vehicle is moving; and when said lighting switch is in an on position and during a stopped state of said vehicle.

2. The lighting system according to claim 1, wherein said vehicle is an electrically operated vehicle and said converter conserves electricity when said lighting switch is in an off position and during a stopped state of said vehicle.

3. The lighting system according to claim 1, and further including a taillight operatively connected to said lighting switch and said converter and being adapted to be connected to a power source, said converter selectively adjusting the voltage supplied to said taillight in accordance with signals generated by said first and second detector means for dimming the taillight when said lighting switch is in an off position and the vehicle is stationary; said light switch is in an off position and the vehicle is moving; and when said lighting switch is in an on position and during a stopped state of said vehicle.

4. The lighting system according to claim 1, and further including a meter light operatively connected to said lighting switch and said converter and being adapted to be connected to a power source, said converter selectively adjusting the voltage supplied to said meter light in accordance with signals generated by said first and second detector means for dimming the meter light when said lighting switch is in an on position and during a stopped state of said vehicle.

5. The lighting system according to claim 1, and further including an interlock switch being operatively connected to said lighting switch for interlocking said interlock switch to be in an on position when said lighting switch is in an on position and for interlocking said interlock switch to be in an off position when said lighting switch is in an off position.

6. The lighting system according to claim 1, wherein said headlight is maintained in an on condition with low voltage being supplied thereto during daylight conditions and when said vehicle is in a stopped condition and said headlight is maintained in on condition with high voltage being supplied thereto when said lighting switch is in an on position and said vehicle is moving.

7. The lighting system according to claim 1, wherein said taillight is maintained in an on condition with low voltage being supplied thereto during daylight conditions and when said vehicle is in a stopped condition and said taillight is maintained in on condition with high voltage being supplied thereto when said lighting switch is in an on position and said vehicle is moving.

* * * * *